(12) United States Patent
Lee et al.

(10) Patent No.: US 10,950,386 B2
(45) Date of Patent: Mar. 16, 2021

(54) MULTILAYER CERAMIC ELECTRONIC COMPONENT

(71) Applicant: SAMSUNG ELECTRO-MECHANICS CO., LTD., Suwon-si (KR)

(72) Inventors: Jang Yeol Lee, Suwon-si (KR); Sun Woong Kim, Suwon-si (KR); Jong Ho Lee, Suwon-si (KR); Jung Su Lee, Suwon-si (KR); Myung Jun Park, Suwon-si (KR)

(73) Assignee: SAMSUNG ELECTRO-MECHANICS CO., LTD., Suwon-si (KR)

( * ) Notice: Subject to any disclaimer, the term of this patent is extended or adjusted under 35 U.S.C. 154(b) by 0 days.

(21) Appl. No.: 16/200,461

(22) Filed: Nov. 26, 2018

(65) Prior Publication Data

US 2020/0118756 A1 Apr. 16, 2020

(30) Foreign Application Priority Data

Oct. 10, 2018 (KR) .......................... 10-2018-0120585

(51) Int. Cl.
*H01G 4/232* (2006.01)
*H01G 4/30* (2006.01)
(Continued)

(52) U.S. Cl.
CPC ............. *H01G 4/2325* (2013.01); *H01G 4/30* (2013.01); *H01G 4/012* (2013.01); *H01G 4/1227* (2013.01)

(58) Field of Classification Search
CPC ...... H01G 4/12; H01G 4/1209; H01G 4/1227; H01G 4/228; H01G 4/2325; H01G 4/252;
(Continued)

(56) References Cited

U.S. PATENT DOCUMENTS 10,529,491 B1 * 1/2020 Kim ....................... H01G 2/065
10,600,571 B1 * 3/2020 Moon ...................... H01G 2/02
(Continued)

FOREIGN PATENT DOCUMENTS

JP 2006310700 A * 11/2006 ............. H01G 4/252
JP 2018137285 A * 8/2018 ............... H01G 4/12
(Continued)

*Primary Examiner* — Timothy J Thompson
*Assistant Examiner* — Guillermo J Egoavil
(74) *Attorney, Agent, or Firm* — Morgan, Lewis & Bockius LLP

(57) ABSTRACT

A multilayer ceramic electronic component includes: a ceramic body having a hexahedral shape including at least one rounded corner and including dielectric layers and first and second internal electrodes, and first and second external electrodes. The first and second external electrodes respectively include first and second base electrode layers which at least partially contact the first and second external sides of the ceramic body, and first and second plating layers disposed to cover the first and second base electrode layers, respectively. CP/CT is equal to or greater than 1.6 and equal to or less than 2.4, where CP is a length of a rounded boundary line of the rounded corner of the ceramic body viewed in a cross-section in length and thickness directions, and CT is a thickness of one of the first and second base electrode layers at a central point in the thickness direction.

10 Claims, 7 Drawing Sheets

(51) Int. Cl.
*H01G 4/012* (2006.01)
*H01G 4/12* (2006.01)

(58) Field of Classification Search
CPC .......... H01G 4/30; H01G 4/012; H01G 4/232; H01G 4/0085
USPC .................. 361/301.4, 321.5, 321.4; 174/260
See application file for complete search history.

(56) References Cited

U.S. PATENT DOCUMENTS

| | | | | |
|---|---|---|---|---|
| 2010/0283114 | A1* | 11/2010 | Katsuki | .................... H01C 7/04 257/467 |
| 2011/0141660 | A1* | 6/2011 | Jeong | ....................... H01G 4/12 361/321.4 |
| 2012/0007709 | A1* | 1/2012 | Taniguchi | ........... H01F 17/0013 336/200 |
| 2014/0209363 | A1 | 7/2014 | Oh et al. | |
| 2016/0071647 | A1* | 3/2016 | Nishisaka | ............. H01G 4/0085 361/301.4 |
| 2019/0006071 | A1* | 1/2019 | Sekiguchi | ........... H01F 17/0013 |
| 2019/0333698 | A1* | 10/2019 | Sugita | .................... H01G 4/012 |

FOREIGN PATENT DOCUMENTS

| | | | | |
|---|---|---|---|---|
| JP | 2018137285 A | * | 8/2018 | ............... H01G 4/12 |
| KR | 10-2014-0096818 A | | 8/2014 | |
| WO | 2009/096333 A1 | | 8/2009 | |

* cited by examiner

A-A'

S

MULTILAYER CERAMIC ELECTRONIC COMPONENT

CROSS-REFERENCE TO RELATED APPLICATION

This application claims the benefit of priority to Korean Patent Application No. 10-2018-0120585 filed on Oct. 10, 2018 in the Korean Intellectual Property Office, the disclosure of which is incorporated herein by reference in its entirety.

TECHNICAL FIELD

The present disclosure relates to a multilayer ceramic electronic component.

BACKGROUND

A multilayer ceramic electronic component has been widely used as an information technology (IT) component in devices such as a computer, a personal digital assistant (PDA), and a portable phone, due to advantages thereof, whereby the multilayer ceramic electronic component is able to be miniaturized, has ensured high capacitance, and may be easily mounted and has also been widely used as an electrical component due to characteristics thereof, such as high reliability and high rigidity.

An external electrode included in a multilayer ceramic electronic component is exposed outside of the multilayer ceramic electronic component and, thus, may largely affect reliability and rigidity.

Recently, an external electrode has been gradually thinned along with the miniaturization and implementation of high performance in products. However, the reliability and rigidity of the external electrode may be degraded as the external electrode is thinned.

SUMMARY

An external electrode may have a hole positioned at points corresponding to a corner of a ceramic body as the external electrode is thinned.

An aspect of the present disclosure may provide a multilayer ceramic electronic component designed to embody an external electrode that does not have the above-mentioned hole while having a small thickness.

According to an aspect of the present disclosure, a multilayer ceramic electronic component may include a ceramic body having a hexahedral shape including at least one rounded corner and including dielectric layers and first and second internal electrodes stacked to be alternately exposed through first and second external sides with the dielectric layer interposed therebetween, and first and second external electrodes disposed on the first and second external sides of the ceramic body and electrically connected to the first and second internal electrodes, respectively. The first and second external electrodes respectively include first and second base electrode layers which at least partially contact the first and second external sides of the ceramic body, and first and second plating layers disposed to cover the first and second base electrode layers, respectively. CP/CT is within a range from 1.6 to 2.4, where CP is a length of a rounded boundary line of the rounded corner of the ceramic body viewed in a cross-section in length and thickness directions, and CT is a thickness of one of the first and second base electrode layers at a central point in the thickness direction.

According to another aspect of the present disclosure, a multilayer ceramic electronic component may include a ceramic body having a a hexahedral shape including at least one rounded corner and including dielectric layers and first and second internal electrodes stacked to be alternately exposed through first and second external sides with the dielectric layer interposed therebetween, and first and second external electrodes disposed on the first and second external sides of the ceramic body and electrically connected to the first and second internal electrodes, respectively. The first and second external electrodes respectively include first and second base electrode layers which at least partially contact the first and second external sides of the ceramic body, and first and second plating layers disposed to cover the first and second base electrode layers, respectively. CP/ET is within a range from 8.4375 to 10.25, where CP is a length of a rounded boundary line of the rounded corner of the ceramic body viewed in a cross-section in length and thickness directions, and ET is a thickness of a portion of a corresponding one of the first and second base electrode layers covering the rounded corner of the ceramic body.

BRIEF DESCRIPTION OF DRAWINGS

The above and other aspects, features and other advantages of the present disclosure will be more clearly understood from the following detailed description taken in conjunction with the accompanying drawings, in which.

DETAILED DESCRIPTION

Figure 1:
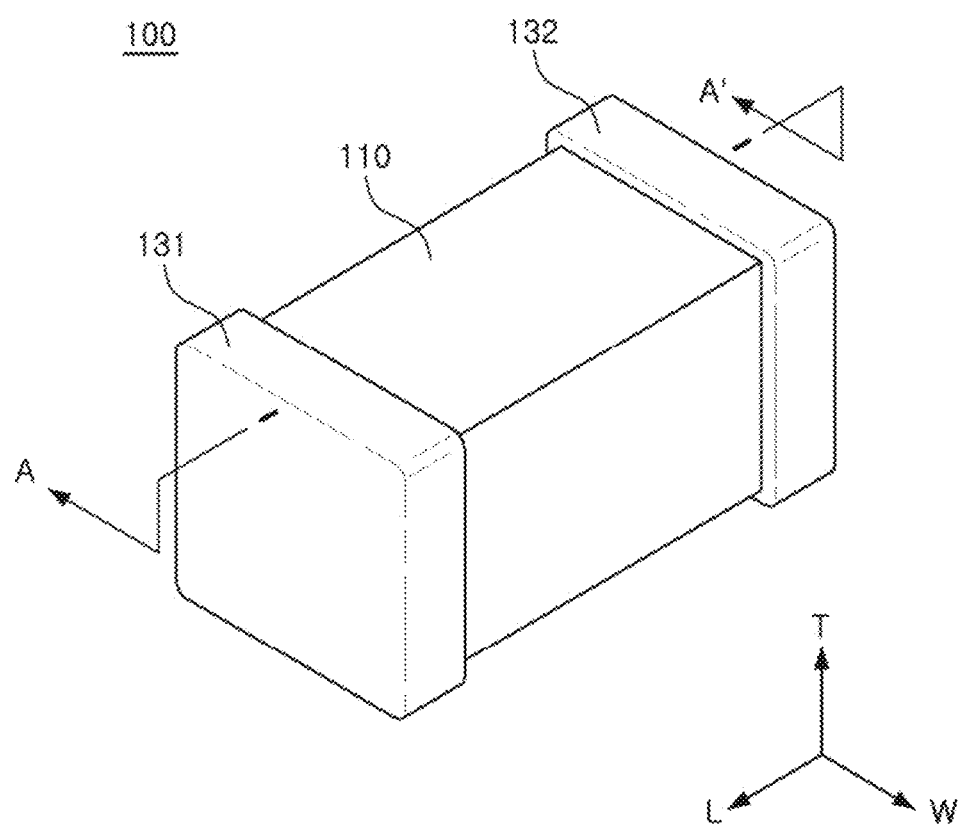
FIG. 1 is a perspective view of a multilayer ceramic electronic component according to an exemplary embodiment in the present disclosure.

Hereinafter, exemplary embodiments in the present disclosure will now be described in detail with reference to the accompanying drawings.

To define directions of a hexahedron for clear explanation of exemplary embodiments of the present disclosure, L, W, and T indicated in the drawings refer to a length direction, a width direction, and a thickness direction, respectively. Here, the thickness direction may be used in the same concept as a stack direction in which dielectric layers are stacked.

Hereinafter, a multilayer ceramic electronic component according to an exemplary embodiment of the present disclosure is described and, in particular, a multilayer ceramic capacitor is described but the multilayer ceramic electronic component is not limited to the multilayer ceramic capacitor.

Figure 2:
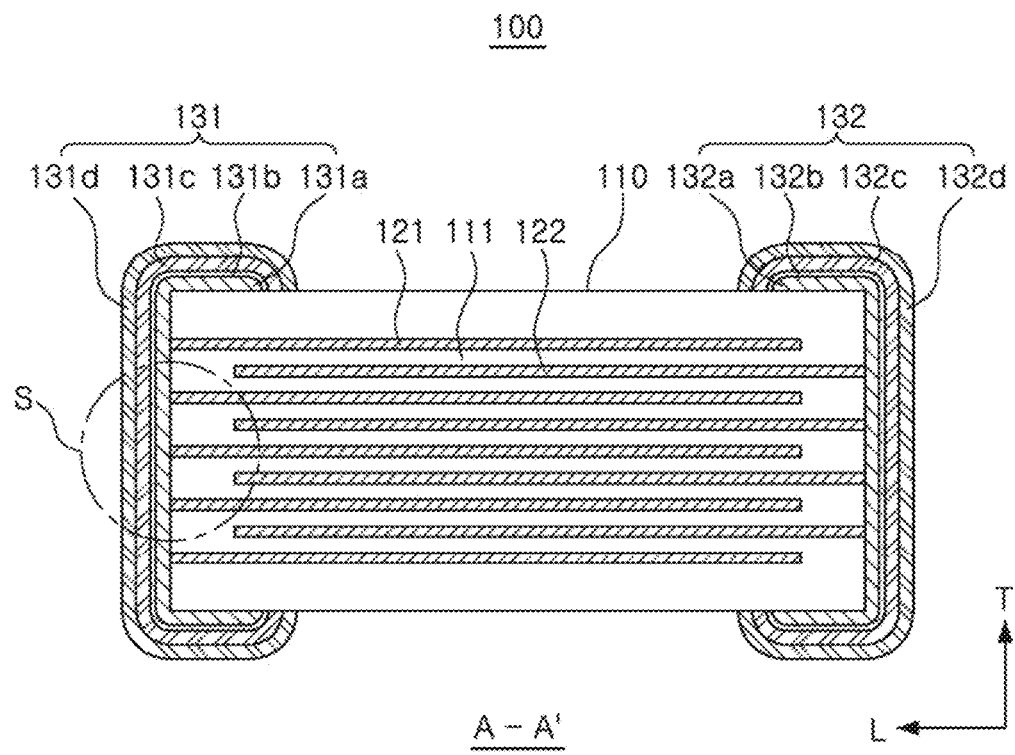
FIG. 2 is a cross-sectional view taken along A-A' of FIG. 1.
Figure 3:
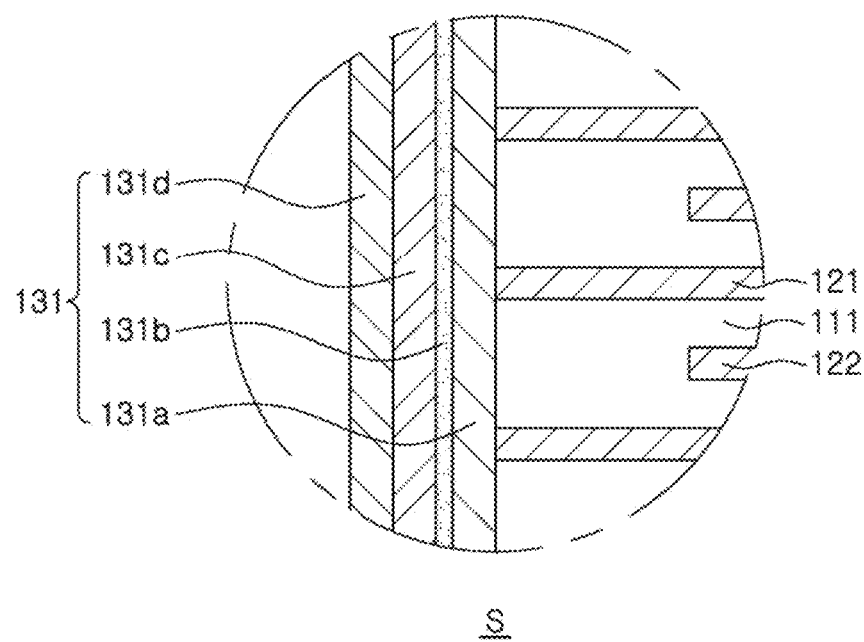
FIG. 3 is an enlarged view of region S of FIG. 2.

FIG. 1 is a perspective view of a multilayer ceramic electronic component according to an exemplary embodiment in the present disclosure. FIG. 2 is a cross-sectional view taken along A-A' of FIG. 1. FIG. 3 is an enlarged view of a region S of FIG. 2.

Referring to FIGS. 1 through 3, a multilayer ceramic electronic component 100 according to an exemplary embodiment in the present disclosure may include a ceramic body 110 and first and second external electrodes 131 and 132.

The ceramic body 110 may have a hexahedral shape having opposite end surfaces in a length direction L, opposite side surfaces in a width direction W, and opposite side surfaces in a thickness direction T. The ceramic body 110 may be formed by stacking a plurality of dielectric layers 111 in the thickness direction T and, then, sintering the stacked dielectric layers 111 and the shape and dimension of the ceramic body 110 and the stack number (one or greater) of the dielectric layers 111 are not limited to the illustrated exemplary embodiment.

The plurality of dielectric layers 111 disposed on the ceramic body 110 may be in a sintered state and may be integrated into each other in such a way that it is difficult to check boundaries between adjacent dielectric layers 111 without use of a scanning electron microscope (SEM).

For example, the ceramic body 110 may be shaped in a hexahedron with eight rounded corners. Accordingly, the durability and reliability of the ceramic body 110 may be enhanced and the structural reliability of the first and second external electrodes 131 and 132 at the corners may be enhanced.

A thickness of the dielectric layer 111 may be arbitrarily changed depending to a capacitance design of the multilayer ceramic electronic component 100 and may include ceramic powders with a high dielectric constant, for example, barium titanate ($BaTiO_3$)-based or strontium titanate ($SrTiO_3$)-based powders but the present disclosure is not limited thereto. In addition, various ceramic additives, organic solvents, plasticizers, bonding agents, dispersants, or the like may be added to the ceramic powders according to an object of the present disclosure.

An average particle diameter of the ceramic powders used to form the dielectric layer 111 is not particularly limited and may be adjusted to achieve an object of the present disclosure but the average particle may be adjusted to, for example, 400 nm or less. For example, the multilayer ceramic electronic component 100 according to an exemplary embodiment in the present disclosure may be used as a component that largely requires miniaturization and high capacitance like an information technology (IT) component.

For example, the dielectric layer 111 may be formed by coating and drying slurry including powders such as barium titanate ($BaTiO_3$) powders on a carrier film to prepare a plurality of ceramic sheets. The ceramic sheet may be formed by mixing ceramic powders, a binder, and a solvent to prepare slurry and preparing the slurry using a doctor blade method in the form of a sheet with a thickness of several μm but the present disclosure is not limited thereto.

First and second internal electrodes 121 and 122 may include at least one first internal electrode 121 and at least one second internal electrode 122 which have different polarities and may be formed at predetermined thicknesses across the plurality of dielectric layers 111 which are stacked in the thickness direction T of the ceramic body 110.

The first internal electrode 121 and the second internal electrode 122 may be formed by printing conductive paste including conductive metal in such a way that one end surface and the other end surface of the ceramic body 110 in the length direction L of the ceramic body 110 are alternately exposed along a stack direction of the dielectric layers 111 and may be electrically insulated from each other by the dielectric layer 111 disposed between the first internal electrode 121 and the second internal electrode 122.

That is, the first and second internal electrodes 121 and 122 may be electrically and respectively connected to the first and second external electrodes 131 and 132 that are formed on opposite lateral surfaces of the ceramic body 110 in the length direction L of the ceramic body 110, through the portions of the ceramic body 110, which are alternately exposed through opposite lateral surfaces in the length direction of the ceramic body 110.

For example, the first and second internal electrodes 121 and 122 may be formed of internal-electrode conductive paste including conductive metal powders with an average particle size of 0.1 to 0.2 μm and 40 to 50 wt % but the present disclosure is not limited thereto.

An internal electrode pattern may be formed by coating the internal-electrode conductive paste on the ceramic sheet using a printing method or the like. The printing method of the conductive paste may be a screen printing method, a gravure printing method, or the like but the present disclosure is not limited thereto. Ceramic sheets with the internal electrode pattern printed thereon may be stacked in 200 to 300 layers and may be compressed and sintered to manufacture the ceramic body 110.

Accordingly, when a voltage is applied to the first and second external electrodes 131 and 132, electric charges may accumulate between the first and second internal electrodes 121 and 122 that face each other and, in this case, capacitance of the multilayer ceramic electronic component 100 may be proportional to an area of a region at which the first and second internal electrodes 121 and 122 overlap with each other.

That is, when the area of the region at which the first and second internal electrodes 121 and 122 overlap with each other is maximized, capacitance may be maximized despite capacitors with the same size.

A thickness of the first and second internal electrodes 121 and 122 may be determined depending on use thereof and may be equal to or less than, for example, 0.4 μm. Accordingly, the multilayer ceramic electronic component 100 according to an exemplary embodiment in the present disclosure may be used as a component that largely requires miniaturization and high capacitance like an IT component.

The thickness of the dielectric layer 111 may correspond to an interval between the first and second internal electrodes 121 and 122 and, thus, capacitance of the multilayer ceramic electronic component 100 may be increased as the thickness of the dielectric layer 111 is reduced.

The conductive metal included in the conductive paste for forming the first and second internal electrodes 121 and 122 may include one or more of nickel (Ni), copper (Cu), palladium (Pd), silver (Ag), lead (Pb), platinum (Pt), and so on in the form of an alloy thereof but the present disclosure is not limited thereto.

The first and second external electrodes 131 and 132 may be disposed on external surfaces of the ceramic body 110 to be connected to the first and second internal electrodes 121 and 122, respectively, and may be configured to electrically connect the first and second internal electrodes 121 and 122 and a board to each other.

The first and second external electrodes 131 and 132 may include first and second plating layers 131*c* and 132*c*, respectively, to achieve at least some of structural reliability, board level packaging with ease, durability with respect to the outside, thermal resistance, and equivalent series resistance (ESR).

For example, the first and second plating layers 131*c* and 132*c* may be formed via sputtering or electric deposition but the present disclosure is not limited thereto.

For example, the first and second plating layers 131*c* and 132*c* may include, but is not limited to, a largest amount of nickel (Ni) and may include one or more of copper (Cu), palladium (Pd), platinum (Pt), gold (Au), silver (Ag), lead (Pb), and so on in the form of an alloy.

The first and second external electrodes 131 and 132 may further include first and second base electrode layers 131*a* and 132*a*, respectively, which are disposed between the first and second internal electrodes 121 and 122 and the first and second plating layers 131*c* and 132*c*, respectively and which partially contact an external side of the ceramic body 110.

The first and second base electrode layers 131*a* and 132*a* may be easily coupled to the first and second internal electrodes 121 and 122 compared with the first and second plating layers 131*c* and 132*c* and, thus, contact resistance with respect to the first and second internal electrodes 121 and 122 may be reduced.

The first and second base electrode layers 131*a* and 132*a* may be disposed in an internal region of the first and second plating layers 131*c* and 132*c* in the first and second external electrodes 131 and 132.

For example, the first and second base electrode layers 131*a* and 132*a* may be covered by the first and second plating layers 131*c* and 132*c* and first and second conductive resin layers 131*b* and 132*b* not to be each exposed outside the multilayer ceramic electronic component 100.

For example, the first and second base electrode layers 131*a* and 132*a* may be formed using a dipping method with respect to paste including a metal component or a method of printing conductive paste including conductive metal on at least one surface of the ceramic body 110 in the thickness direction T or may also be formed using a sheet transfer method or a pad transfer method.

For example, the first and second base electrode layers 131*a* and 132*a* may include one or more of copper (Cu), nickel (Ni), palladium (Pd), platinum (Pt), gold (Au), silver (Ag), lead (Pb), and so on in the form of an alloy.

The first and second external electrodes 131 and 132 may further include the first and second conductive resin layers 131*b* and 132*b*, respectively, that are disposed between the first and second base electrode layers 131*a* and 132*a* and the first and second plating layers 131*c* and 132*c*, respectively.

The first and second conductive resin layers 131*b* and 132*b* have relatively high flexibility compared with the first and second plating layers 131*c* and 132*c* and, thus, may be protected from external physical impacts or flexural impacts of the multilayer ceramic electronic component 100, and may absorb stress applied during board level packaging or tension stress to prevent an external electrode from cracking.

For example, the first and second conductive resin layers 131*b* and 132*b* may be configured in such away that glass or resin with high flexibility, e.g., epoxy resin contains conductive particles such as copper (Cu), nickel (Ni), palladium (Pd), platinum (Pt), gold (Au), silver (Ag), or lead (Pb) to have high flexibility and high conductivity.

The first and second external electrodes 131 and 132 may further include first and second tin plating layers 131*d* and 132*d*, respectively, which are disposed outside the first and second plating layers 131*c* and 132*c*, respectively. The first and second tin plating layers 131*d* and 132*d* may further enhance at least one some of structural reliability, board level packaging with ease, durability with respect to the outside, thermal resistance, and ESR.

Figure 4:
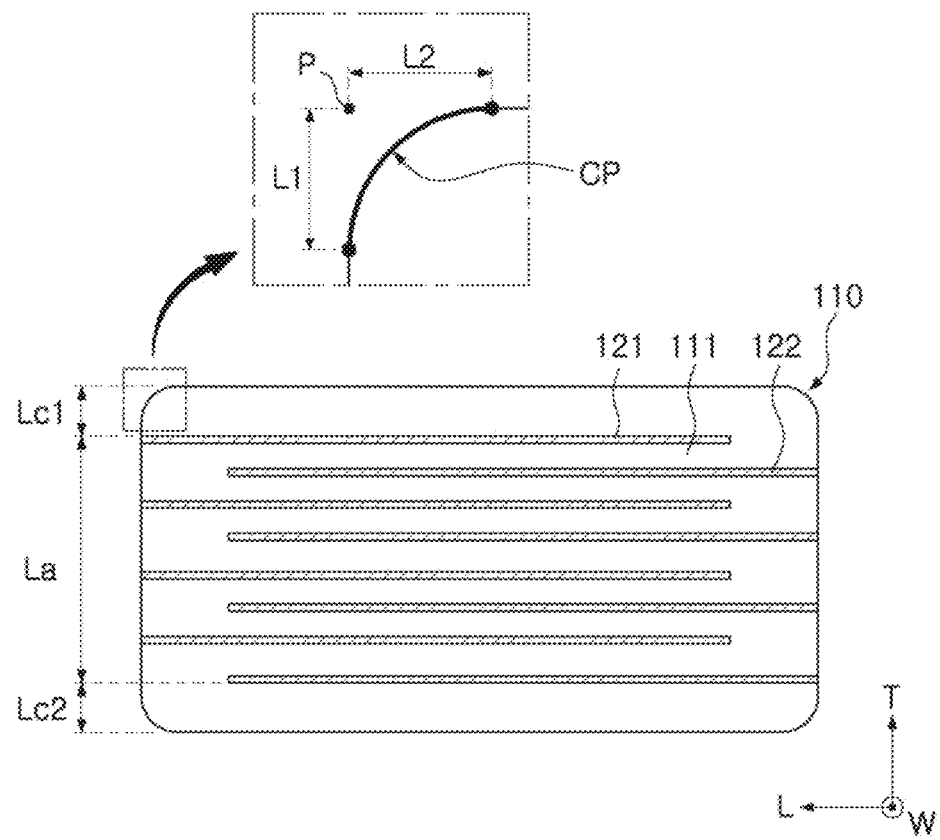
FIG. 4 is a side view illustrating dimensions of a ceramic body of a multilayer ceramic electronic component according to an exemplary embodiment in the present disclosure.
Figure 5:
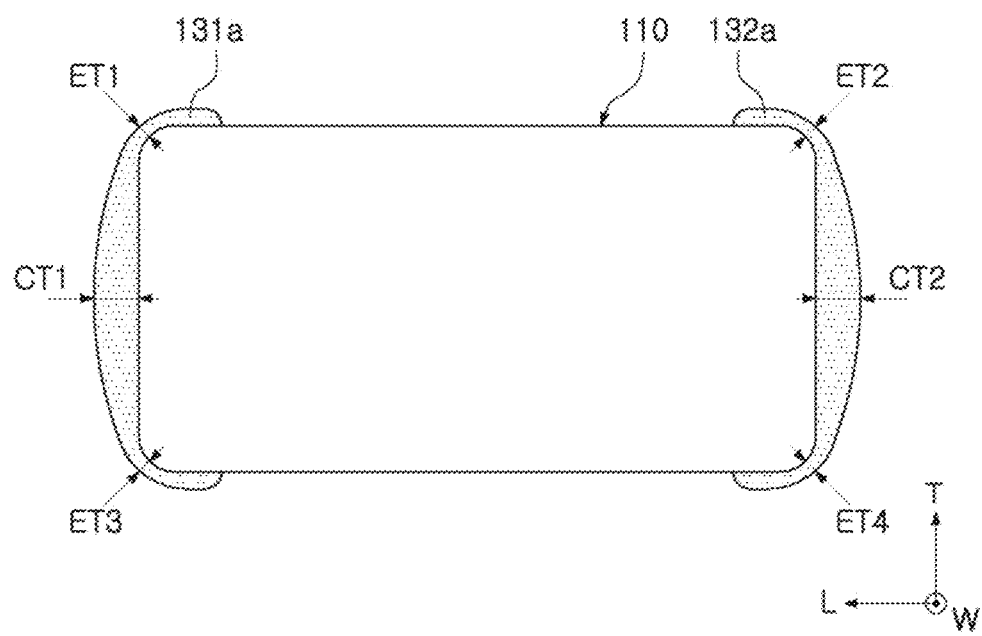
FIG. 5 is a side view illustrating dimensions of an external electrode of a multilayer ceramic electronic component according to an exemplary embodiment in the present disclosure.

FIG. 4 is a side view illustrating dimensions of a ceramic body of a multilayer ceramic electronic component according to an exemplary embodiment in the present disclosure. FIG. 5 is a side view illustrating dimensions of an external electrode of a multilayer ceramic electronic component according to an exemplary embodiment in the present disclosure.

Referring to FIG. 4, the ceramic body 110 may be shaped in a hexahedron with at least one rounded corner.

Viewed in a cross-section in length and thickness directions, an intersection between an imaginary extension line of the ceramic body 110 in the thickness direction and an imaginary extension line of the ceramic body 110 in the length direction may be defined as P.

Straight distances to a start point and an end point of a rounded boundary line of a rounded corner of the ceramic body 110 from P may be defined L1 and L2, respectively. Here, the start point may be defined as a point at which a lateral surface of the ceramic body 110 begins to be diagonally inclined and the end point may be defined as a point at which an upper or lower surface of the ceramic body 110 begins to be diagonally inclined.

Here, a length from the start point to the end point along the rounded boundary line of the ceramic body 110 may be defined as CP. CP may be a length of a rounded boundary line of the rounded corner of the ceramic body in a cross-section in length and thickness directions.

A size of CP may be adjusted by adjusting a grinding time during a grinding procedure of the ceramic body 110. For example, CP may be 23.52, 27.03, 38.42, 40.87, 44.11, and 49.27 when the grinding time is 5 minutes, 15 minutes, 25 minutes, 35 minutes, 45 minutes, and 55 minutes, respectively.

Referring to FIG. 5, a thickness of a first base electrode layer 131*a* at a central point in the thickness direction may be defined as CT1 and a thickness of a second base electrode layer 132*a* at a central point in the thickness direction may be defined as CT2. With regard to CT, the center may refer to a center viewed in the length direction.

A center thickness of the first base electrode layer 131*a* at an upper corner may be defined as ET1, a center thickness of the second base electrode layer 132*a* at an upper corner may be defined as ET2, a center thickness of the first base electrode layer 131*a* at a lower corner may be defined as ET3, and a center thickness of the second base electrode layer 132*a* at a lower corner may be defined as ET4. With regard to ET, the center may refer to the center that is viewed in a normal direction of a surface of a corner.

The first and second base electrode layers 131*a* and 132*a* may each have a thickness deviation.

During formation of the first and second base electrode layers 131*a* and 132*a*, a corner portion of the first and second base electrode layers 131*a* and 132*a* may be leaned toward the first and second base electrode layers 131*a* and 132*a* due to the liquidity, rheology, and/or mooning phenomenon of conductive paste.

Accordingly, CT1 and CT2 may be the largest thickness of the first and second base electrode layers 131*a* and 132*a* and ET1, ET2, ET3, and ET4 may be the smallest thickness of the first and second base electrode layers 131a and 132a.

In general, when the average thickness of the first and second base electrode layers 131a and 132a is gradually reduced, a hole may be formed in a corner of each of the first and second base electrode layers 131a and 132a.

The hole that is formed as the first and second base electrode layers 131a and 132a are thinned may function as a path of permeation of external moisture to degrade wet resistance reliability and to also degrade installation reliability.

The hole of the corner is formed based on the liquidity, rheology, and/or mooning phenomenon of conductive paste and, thus, a frequency at which the hole of the corner is formed may be lowered as CP of the ceramic body 110 is increased.

Table 1 below shows a hole forming frequency of a corner, an installation error frequency, and a wet resistance reliability error frequency depending on CP of the ceramic body 110.

TABLE 1

| CP | Hole forming frequency | Installation error frequency | Wet resistance reliability error frequency |
| --- | --- | --- | --- |
| 8 μm | 32/100 | 5/400 | 3/400 |
| 23 μm | 8/100 | 1/400 | 0/400 |
| 27 μm | 0/100 | 0/400 | 0/400 |
| 38 μm | 0/100 | 0/400 | 0/400 |
| 41 μm | 0/100 | 0/400 | 0/400 |
| 44 μm | 0/100 | 0/400 | 0/400 |

As shown in Table 1 above, when CP of the ceramic body 110 is equal to or greater than 27 μm, the first and second base electrode layers 131a and 132a may not have a hole.

When CP of the ceramic body 110 is excessively large, an entire thickness of the first and second base electrode layers 131a and 132a may be excessively large based on the liquidity, rheology, and/or mooning phenomenon of conductive paste.

When the first and second base electrode layers 131a and 132a are excessively thick, a ceramic body may be relatively reduced to maintain an entire size of a multilayer ceramic electronic component. Accordingly, capacitance compared with the entire size of the multilayer ceramic electronic component may be reduced.

The first and second base electrode layers 131a and 132a may have enhanced reliability and flexural rigidity compared with costs of the multilayer ceramic electronic component as an average thickness is reduced.

Accordingly, the multilayer ceramic electronic component according to an exemplary embodiment in the present disclosure may be designed in such a way that CP is not excessively large and, thus, may have miniaturization and high capacitance.

Table 2 below shows CT and ET depending on CP of the ceramic body 110. Here, a thickness of a portion of the first and second base electrode layers 131a and 132a, positioned on an upper or lower surface of the ceramic body 110, may be about 8 μm to 9 μm but is not limited thereto.

TABLE 2

| CP | CT | ET |
| --- | --- | --- |
| 8 μm | 16.7 μm | 3.2 μm |
| 23 μm | 16.9 μm | 3.2 μm |

TABLE 2-continued

| CP | CT | ET |
| --- | --- | --- |
| 27 μm | 16.8 μm | 3.2 μm |
| 38 μm | 16.9 μm | 3.5 μm |
| 41 μm | 17.0 μm | 4.0 μm |
| 44 μm | 17.6 μm | 4.7 μm |
| 50 μm | 18.8 μm | 5.6 μm |

As shown in Table 2 above, when CP of the ceramic body 110 is greater than 41 μm, CT and ET of the first and second base electrode layers 131a and 132a may be rapidly increased along with increase in CP.

Accordingly, when CP of the ceramic body 110 is within a range from 27 μm to 41 μm, the base electrode layers 131a and 132a may not have a hole and may also be thinned.

CP of the ceramic body 110 may have a correlation with CT and/or ET.

That is, the multilayer ceramic electronic component according to an exemplary embodiment in the present disclosure may optimize CP/CT or CP/ET based on Tables 1 and 2 above.

In the multilayer ceramic electronic component according to an exemplary embodiment in the present disclosure, CP/CT may be within a range from 1.6 to 2.4, where CT is a thickness of one of the first and second base electrode layers 131a and 132a at a central point in the thickness direction.

In the multilayer ceramic electronic component according to an exemplary embodiment in the present disclosure, CP/ET may be within a range from 8.4375 to 10.25, where ET is center thickness of a portion of a corresponding one of the first and second base electrode layers 131a and 132a covering the rounded corner of the ceramic body.

Accordingly, the multilayer ceramic electronic component according to an exemplary embodiment in the present disclosure may further include a base electrode that is thin and has no hole to reduce installation error and enhance wet resistance reliability and to also ensure reliability and flexural rigidity compared with costs.

The rounded corner of the ceramic body 110 may be shaped in ⅛ of a sphere and CP of the ceramic body 110 may be a length of ¼ times a circumference of a cross-section of the sphere.

Accordingly, the multilayer ceramic electronic component according to an exemplary embodiment in the present disclosure may more precisely optimize CP/CT or CP/ET, thereby largely reducing installation error and largely enhancing wet resistance reliability.

Referring to FIG. 4, the ceramic body 110 may further include a first protective layer with a thickness of Lc1, disposed on the first and second internal electrodes 121 and 122, and a second protective layer with a thickness of Lc2, disposed below the first and second internal electrodes 121 and 122. The first and second protective layers may protect the ceramic body 110 from external shocks.

The first and second protective layers may have a large thickness to ensure an interval between the rounded portion of the corner of the ceramic body 110 and the first and second internal electrodes 121 and 122. For example, Lc1 and Lc2 may each be greater than or equal to 20 μm.

Accordingly, CP/Lc may be within a range from 1.35 to 2.05.

Accordingly, the multilayer ceramic electronic component according to an exemplary embodiment in the present disclosure may ensure the first and second base electrode layers 131a and 132a that are thin and have no hole and may also ensure the reliability (e.g., delamination and flexural rigidity) of the first and second internal electrodes 121 and 122.

Figure 6:
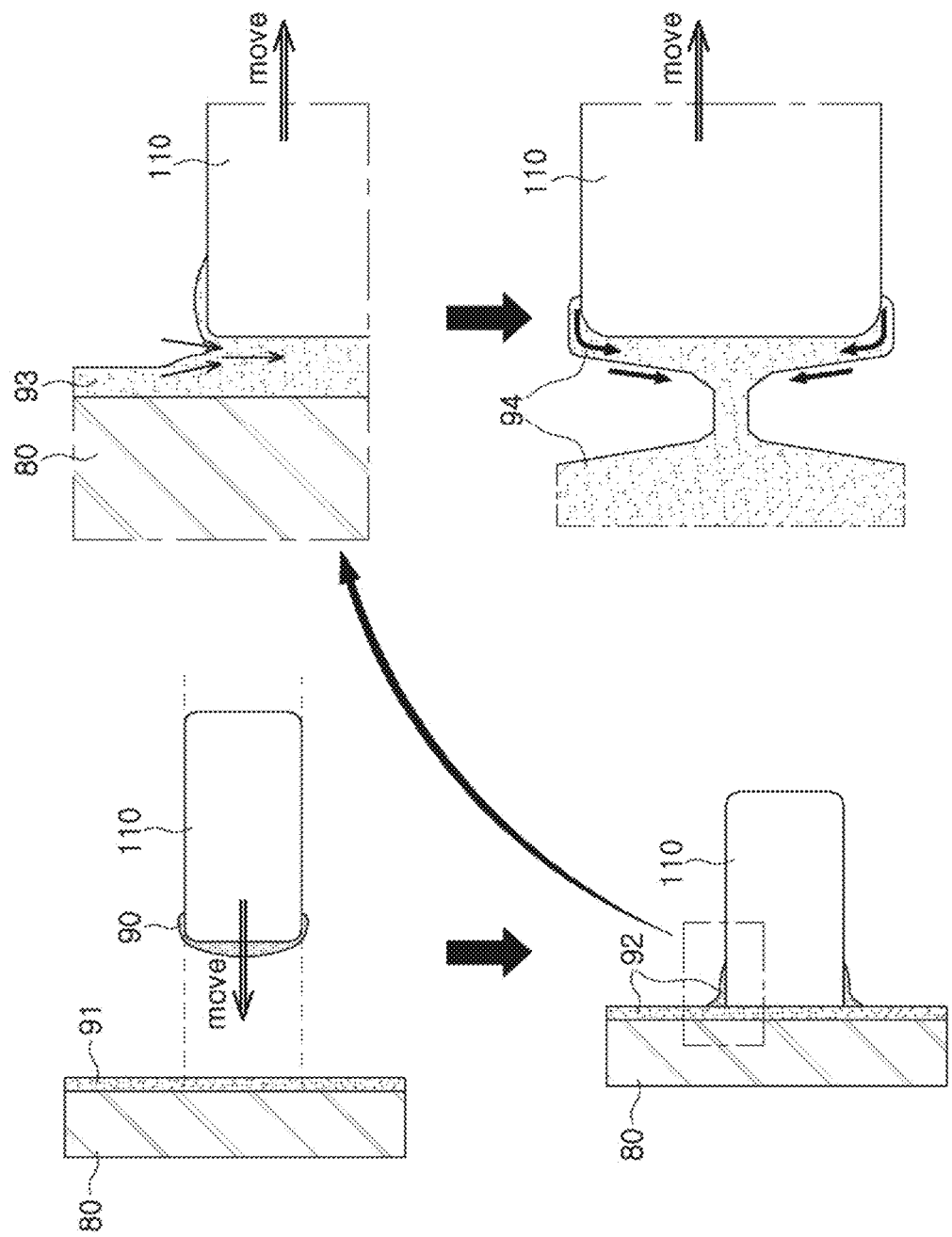
FIG. 6 is a diagram illustrating an example of a procedure of forming a base electrode layer.

FIG. 6 is a diagram illustrating an example of a procedure of forming a base electrode layer.

Referring to FIG. 6, the ceramic body 110 with conductive paste 90 coated thereon may be dipped onto a paste base 91 on a base member 80. Accordingly, conductive paste 92 may extend up to upper and lower surfaces of the ceramic body 110.

Then, the ceramic body 110 may be disposed away from the base member 80.

In this case, conductive pastes 93 and 94 may be leaned toward the center of a lateral surface of the ceramic body 110 due to liquidity, rheology, and/or mooning phenomenon.

Here, when CP of the ceramic body 110 is excessively small, conductive pastes 93 and 94 may not be distributed at a portion of the corner of the ceramic body 110.

When CP of the ceramic body 110 is excessively large, the amount of conductive pastes 93 and 94 that remains on the ceramic body 110 may be excessively large. Accordingly, the thickness of the base electrode layer may be excessively large.

The multilayer ceramic electronic component according to an exemplary embodiment in the present disclosure may be configured in such away that conductive paste equally remains at the corner of the ceramic body 110 and, simultaneously, the total amount of the conductive paste is adjusted not to be excessively large during the procedure of forming of the base electrode layer.

Figure 7:
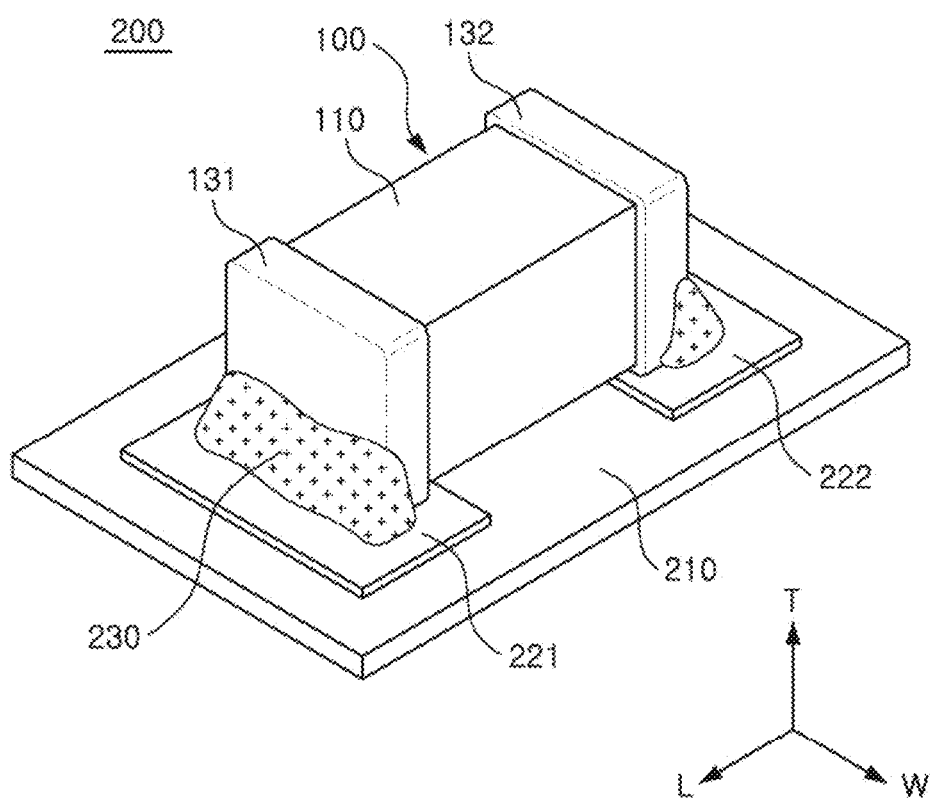
FIG. 7 is a perspective view illustrating an example of an installation formation of a multilayer ceramic electronic component according to an exemplary embodiment in the present disclosure.
Figure 8A:
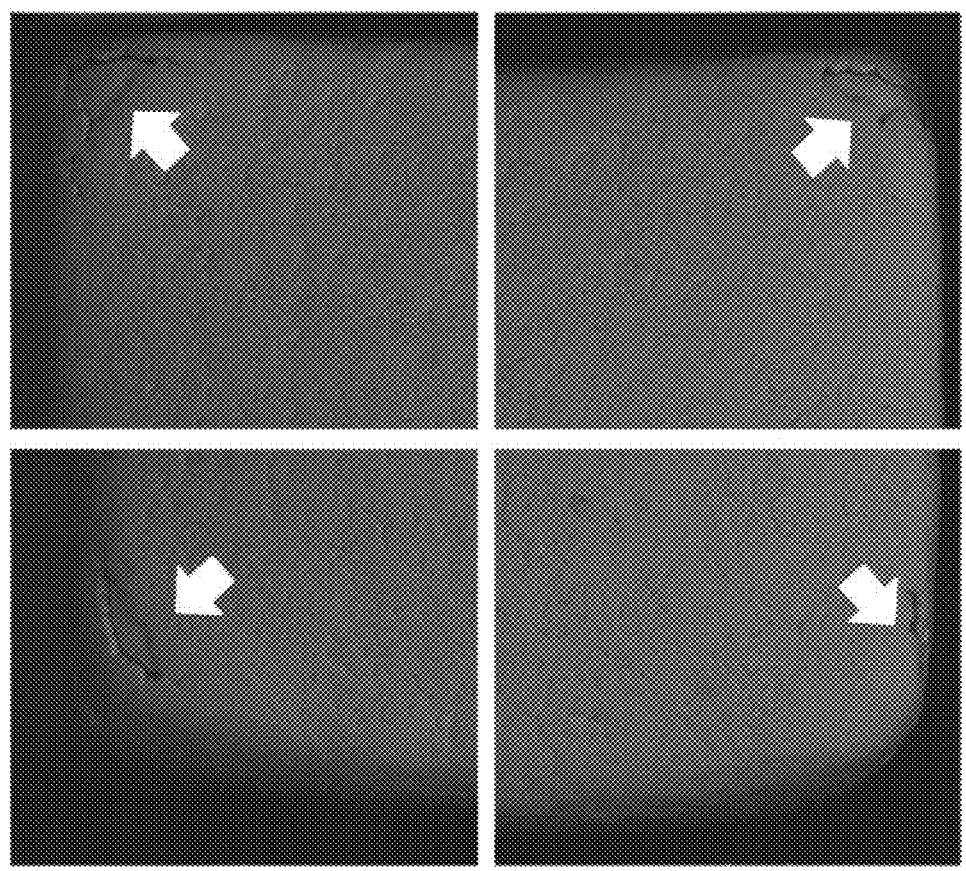
FIG. 8A is a scanning electron microscope (SEM) image illustrating an example of a multilayer ceramic electronic component with a hole formed in a corner.
Figure 8B:
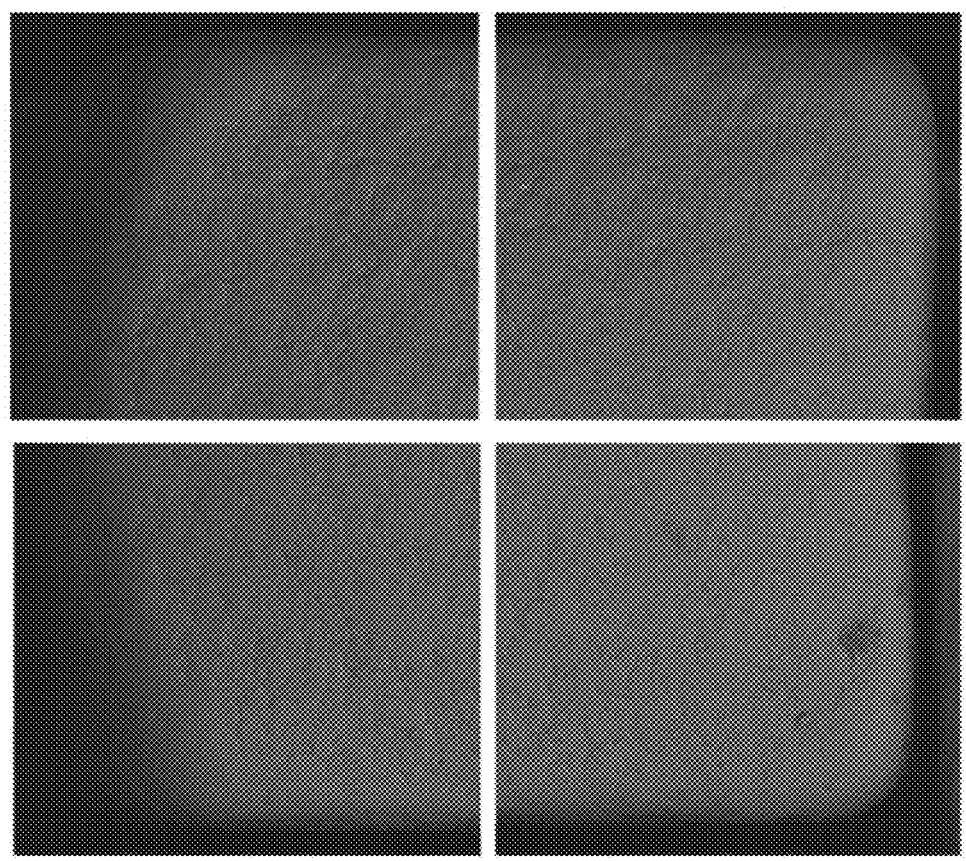
FIG. 8B is an SEM image of a multilayer ceramic electronic component with no hole in a corner.

FIG. 7 is a perspective view illustrating an example of an installation formation of a multilayer ceramic electronic component according to an exemplary embodiment in the present disclosure.

Referring to FIG. 7, the multilayer ceramic electronic component 100 according to an exemplary embodiment in the present disclosure may include first and second solders 230 that are connected to the first and second external electrodes 131 and 132, respectively, and may be electrically connected to a board 210.

For example, the board 210 may include first and second electrode pads 221 and 222 and the first and second solders 230 may be disposed on the first and second electrode pads 221 and 222, respectively.

When a corner of the ceramic body 110 is rounded, the first and second solders 230 may fill a space formed due to the rounded corner of the ceramic body 110 to be stably connected to the first and second external electrodes 131 and 132.

The first and second solders 230 may be more closely coupled to the first and second external electrodes 131 and 132 along with a reflow procedure and, in this regard, the multilayer ceramic electronic component 100 according to an exemplary embodiment in the present disclosure may have installation reliability while having the first and second external electrodes 131 and 132 that are relatively thin and, thus, may prevent the first and second solders 230 from being cut during reflow.

As set forth above, according to exemplary embodiments in the present disclosure, a multilayer ceramic electronic component may be configured to have a thin external electrode and may also maintain substantial wet resistance reliability and a low installation defective rate of the external electrode.

While exemplary embodiments have been shown and described above, it will be apparent to those skilled in the art that modifications and variations could be made without departing from the scope of the present invention as defined by the appended claims.

What is claimed is:

1. A multilayer ceramic electronic component comprising:
a ceramic body having a hexahedral shape including at least one rounded corner and including dielectric layers and first and second internal electrodes stacked to be alternately exposed through first and second external sides with the dielectric layer interposed therebetween; and
first and second external electrodes disposed on the first and second external sides of the ceramic body and electrically connected to the first and second internal electrodes, respectively,
wherein the first and second external electrodes respectively include first and second base electrode layers which at least partially contact the first and second external sides of the ceramic body, and first and second plating layers disposed to cover the first and second base electrode layers, respectively, and
wherein CP/CT is within a range from 1.6 to 2.4, where CP is a length of a rounded boundary line of the at least one rounded corner of the ceramic body viewed in a cross-section in length and thickness directions, and CT is a thickness of one of the first and second base electrode layers at a central point in the thickness direction.

2. The multilayer ceramic electronic component of claim 1, wherein CP is within a range from 27 μm to 41 μm.

3. The multilayer ceramic electronic component of claim 2, wherein the at least one rounded corner of the ceramic body is shaped in approximately ⅛ of a sphere and CP is a length of approximately ¼ times a circumference of a cross-section of the sphere.

4. The multilayer ceramic electronic component of claim 1, wherein the ceramic body further includes a first protective layer disposed above the first and second internal electrodes and a second protective layer disposed below the first and second internal electrodes, and
wherein CP/Lc is equal to or greater than 1.35 and equal to or less than 2.05 in which Lc is a thickness of a protective layer closer to the at least one rounded corner among the first and second protective layers.

5. The multilayer ceramic electronic component of claim 4, wherein CP/ET is within a range from 8.4375 to 10.25, where ET is a thickness of a portion of a corresponding one of the first and second base electrode layers covering the at least one rounded corner of the ceramic body.

6. The multilayer ceramic electronic component of claim 5, wherein the first and second external electrodes further include first and second tin plating layers disposed outside the first and second plating layers, respectively, and
wherein the first and second plating layers are mainly composed of nickel (Ni).

7. The multilayer ceramic electronic component of claim 4, wherein Lc is greater than or equal to 20 μm.

8. The multilayer ceramic electronic component of claim 1, wherein CP starts at a start point and ends at an end point, the start point being defined as a point at which a lateral surface of the ceramic body begins to be diagonally inclined and the end point being defined as a point at which an upper or lower surface of the ceramic body begins to be diagonally inclined.

9. The multilayer ceramic electronic component of claim 1, wherein the dielectric layer disposed between the first and second internal electrodes has an average thickness equal to or less than 0.4 μm.

10. The multilayer ceramic electronic component of claim 1, wherein the first and second internal electrodes have an average thickness equal to or less than 0.4 μm.

* * * * *